(12) United States Patent
Johnston

(10) Patent No.: US 9,262,311 B1
(45) Date of Patent: Feb. 16, 2016

(54) NETWORK PAGE TEST SYSTEM AND METHODS

(71) Applicant: Amazon Technologies, Inc., Seattle, WA (US)

(72) Inventor: Simon K. Johnston, Snohomish, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/095,792

(22) Filed: Dec. 3, 2013

(51) Int. Cl.
*G06F 9/44* (2006.01)
*G06F 11/36* (2006.01)

(52) U.S. Cl.
CPC .................... *G06F 11/3688* (2013.01)

(58) Field of Classification Search
None
See application file for complete search history.

(56) References Cited

U.S. PATENT DOCUMENTS

| | | | |
|---|---|---|---|
| 8,601,434 B2* | 12/2013 | De Keukelaere et al. .... | 717/106 |
| 8,863,085 B1* | 10/2014 | Stahlberg .................. | 717/124 |
| 9,003,423 B1* | 4/2015 | Rodriguez Valadez et al. ............... | 719/310 |
| 2004/0010543 A1* | 1/2004 | Grobman .......... | G06F 17/30902 709/203 |
| 2008/0295070 A1* | 11/2008 | Bozza et al. .................. | 717/106 |
| 2010/0064281 A1* | 3/2010 | Kimball et al. .............. | 717/124 |
| 2012/0174075 A1* | 7/2012 | Carteri et al. ................ | 717/127 |
| 2013/0004087 A1* | 1/2013 | Kumar et al. ................. | 382/218 |
| 2013/0346302 A1* | 12/2013 | Purves et al. ................. | 705/40 |
| 2014/0245264 A1* | 8/2014 | Bartley et al. ............... | 717/124 |

OTHER PUBLICATIONS

Conde, Carlos, and Attila Narin. "Development and Test on Amazon Web Services." Amazon Web Service.N.p., Nov. 2012. Web. Nov. 29, 2014. <http://media.amazonwebservices.com/AWS_Development_Test_Environments.pdf>.*
"How to: Specify a Test Run Configuration." Microsoft Developer Network.N.p., Dec. 18, 2010. Web. Nov. 29, 2014. <http://msdn.microsoft.com/en-us/library/ms182480>.*
Wilton-Jones, Mark. "DOM nodes and tree." How to Create.N.p., Mar. 19, 2011. Web. Nov. 29, 2014.<http://www.howtocreate.co.uk/tutorials/javascript/dombasics>.*
Panda, Debu. "Out-of-Container EJB 3.0 Testing with Oracle Entity Test Harness." Oracle Technology Network.N.p., Apr. 2006. Web. Nov. 29, 2014. <http://www.oracle.com/technetwork/articles/debu-testability-of-ejb-095455.html>.*

* cited by examiner

*Primary Examiner* — Wei Zhen
*Assistant Examiner* — Binh Luu
(74) *Attorney, Agent, or Firm* — Knobbe, Martens, Olson & Bear, LLP

(57) ABSTRACT

Systems and methods for testing a network page without encapsulating the network page with a test environment are presented. A script such as a test injector script may be added to a network page in development. The test injector script may identify one or more tests to run on the network page based, at least in part, on metadata included in the network page. The domain object model (DOM) of the network page may be modified to include tests to be performed on the network page.

21 Claims, 5 Drawing Sheets

NETWORK PAGE TEST SYSTEM AND METHODS

BACKGROUND

Software applications are typically tested by developers or software testers to remove bugs or programming errors before being released to end-users. Often, a software application will go through several iterations before being released to end-users to remove detected programming errors, add features, or respond to beta-user feedback. Each iteration of the software application may result in additional rounds of testing. Further, some applications may have several release versions or updates over time, each of which may also have several rounds of testing.

A network page may also be tested by a developer or tester. In some cases, network pages may be simple static pages that require little to no testing. However, it is often the case that a network page can be complex, and sometimes, may be as complex as an extensive software application. Further, in some cases, the network page may be a software application or part of a software application. As such, network pages may go through extensive testing, and sometimes, may be tested as extensively as a complex software application utilizing its own test environment.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Figure 1:
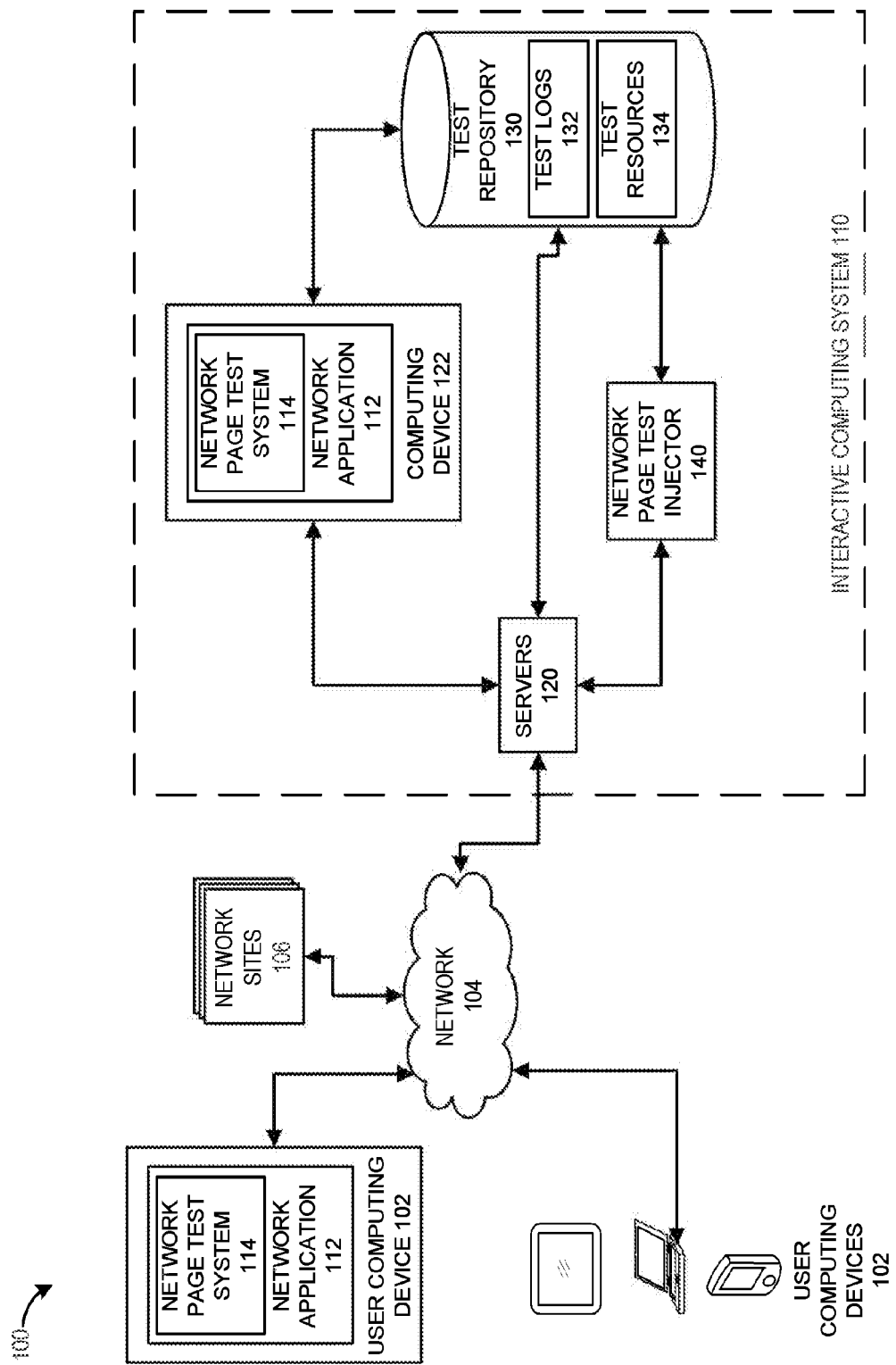
FIG. 1 illustrates an embodiment of a networked computing environment for testing network pages hosted by a network site provider.

It is typically desirable to test an application before releasing it for public consumption. This is true for network pages (e.g., webpages) as well. As network pages become more complex, such as through the inclusion of various scripts (e.g., JavaScript®, ActionScript®, etc.), the complexity of testing the network pages increases. Often, the testing requires human interaction to set up the test environment, to provide test data, and to confirm that the test was successfully executed. This human interaction can make testing a network page both expensive and time-consuming.

Further, when a network page is modified, often the test environment will break. In such cases, it may be necessary to update or modify the test environment, Updating the test environment each time there is a change to a network page can itself be an expensive and time-consuming process. Further, many test environments work by encapsulating the network page to be tested. In some cases, these test environments can result in false positives and/or false negatives because they cannot determine that the structure of the network page may have been modified. In addition, in some cases, the test environment may not be representative of the end-user's environment because it can be difficult to anticipate the configuration of the computing system from which each user may access the network page. Further, using the most common computing systems for the test environment may not be sufficient because, for example, each user may alter the configuration of his or her computing system upon purchase by, for example, installing different network access applications (e.g., browsers), peripherals, operating systems, and/or other types of applications.

Certain embodiments of this disclosure present systems and methods for testing a network page without encapsulating the network page within a test environment. In certain embodiments, a script such as a test injector script or a test execution service may be added to a network page in development. In some cases, the test injector script may be extracted or removed from the network page after completion of testing. In other cases, the test injector script may remain in the network page when it is published for user consumption or hosted by a computing system for access by end-users (e.g., customers or other public users). In certain embodiments, by retaining the test injector script in the network page after the network page is published, tests may be performed on a production version of the network page, such as in response to an error occurring when an end-user or consumer accesses the network page.

In certain embodiments, the test injector script can identify tests to perform on a network page based on metadata included in the network page. These tests and/or data for performing one or more tests may be loaded into the network page. For example, upon identifying a test to perform, the test injector script may access a source location, such as a repository, identified by the metadata in the network page to obtain test resources, such as test scripts. The test injector script may modify the network page, such as by modifying the domain object model (DOM) of the network page to include the test resource or a link to the test resource.

As previously stated, the test injector script can be hosted within the network page and may automatically execute tests within the context of the network page. In certain embodiments, including the test injector script in the network page allows for a more seamless test support for network pages as each network page can be associated with one or more test suites and the test injector script can either run the tests ad-hoc from a user application (e.g., a browser) or as part of an automated regression or integration test suite. Further, embodiments described herein allow for the identification of tests within production network pages by the addition of metadata to pages which can be used by the test injector script to load and execute tests within the network page without modification of the source network page code. Thus, in some cases, a separate test version of a network page can be omitted and the same network page code may be used both for testing the network page and for use in a production or non-test environment. This feature is in contrast to many test software applications for network pages that typically provide an execution environment or test container that wraps around a network page or encapsulates the network page, or which are only capable of testing components of a network page in isolation. The ability to load tests from the test injector script added to a network page can allow for the execution of tests as required. For example, on the detection of an anomaly in a specific environment, the tests can be invoked to determine specific causes of errors.

Certain embodiments described herein enable testing a network page in-situ without having to produce a test version of the network page, or test components of the page under test conditions. Further, embodiments disclosed herein enable tests to be performed immediately (or rapidly) or in a deferred mode by, for example, enabling a user to initiate tests and/or enabling tests to be initiated in response to captured errors by, for example, a network application (e.g., a browser). Further, the tests may be run in a traditional browser with a graphical user interface, in a headless browser, or in any other type of network application.

In some cases, the insertion of test resources by a test injector script into a network page by modifying the DOM of the network page to include the test resources for testing the network page enables at least some of the test resources to access an Application Programming Interface (API) for elements included in the network page. In certain embodiments, this ability to access the API of page elements enables more accurate testing of a network page compared to test systems or test environments that encapsulate a network page and attempt to test the network page by mimicking a human interacting with the network page. In other words, while a number of test environments attempt to fake or mimic button presses and text entry by a user, embodiments of the present disclosure can run tests and test code within the context of the network application itself by, for example, causing portions of the network page to execute. In some cases, causing portions of the network page to execute may include accessing the API of elements of the network page.

In some embodiments, a network page server, network site, or other interactive computing system configured to provide access to a network page may include versions of the network page with test metadata and/or a test injector script included in the network page. The network page server may then determine upon receiving a request from a user whether a test version of the page should be provided to the user's computing system or whether a production version of the page without test metadata or the test injector script should be provided. If a production version of the page is to be provided, the network page server may be configured to strip out or remove the test metadata and/or the test injector script and the network page is served or provided to the user's computing system. If instead a developer version of the page is to be provided for testing purposes, the test metadata and/or the test injector script may be maintained in the network page when it is provided to the requesting user's computing system. The network page server may determine whether to provide the test version or the production version of the network page based on any type of determination factor. For example, the determination factor may be based on a command received from a user, a lack of a command received, a default configuration, a location of the user, an identity of the user's computing device, an Internet Protocol (IP) address (e.g., external to a computing environment versus internal to the computing environment), and the like.

Example Networked Computing Environment

FIG. 1 illustrates an embodiment of a networked computing environment 100 for testing network pages hosted by a network site provider. The network pages can include any type of network page that may provide a user, a computing system, or another network page with access to content. For example, in some cases, the network page may be a webpage or a website. The network site provider may be any organization or entity that owns, posts, or is associated with one or more network sites 106 or content providers that host one or more network pages.

The networked computing environment 100 may include an interactive computing system 110. The interactive computing system 110 may include any system for facilitating tests of a network site 106 or a network page hosted by a network site 106. In some cases the interactive computing system 110 may be an independent system or associated with an independent organization. In other cases, the interactive computing system 110 may itself be a network site 106, or may be included by, or associated with, one or more of the network sites 106.

The interactive computing system 110 can include a number of systems for hosting a network page and/or for testing a network page. For example, the interactive computing system 110 of FIG. 1 includes a number of servers 120, a computing device 122, a test repository 130 and a network page test injector 140. Each of these systems may be used to help host a network page and/or to help test a network page. For example, one or more of the servers 120 may host a network page and/or provide test resources, such as test code, for testing a network site 106; or a network page hosted by a network site 106 or the interactive computing system 110. Further, the servers 120 may include any type of computing system that enables access to one or more other systems of the interactive computing system 110. For example, the servers 120 may include network servers, application servers, web servers, network page servers, and the like. Although the term servers is used to describe the servers 120, the systems of the networked computing environment 100 are not limited to a client/server architecture, and any other type of architecture for the computing devices of the networked computing environment 100 is possible in the context of the present disclosure.

In some cases, a network page test injector 140 can include any system capable of injecting a test injector script into a network page. Injecting the test injector script into the network page may include adding code, such as a script, to the code of the network page. In other cases, injecting the test injector script to the network page may include adding a link to the test injector script to the network page. The test injector script can include any type of software module that can manage tests of a network page including the test injector script. In some cases, the test injector script may perform or facilitate tests of other network pages besides the network page that includes the test injector script. For example, in some cases a test injector script can test a network page that is linked to the network page including the test injector script. Further, the test injector script can identify the tests associated with a network page and access one or more testing resources for performing the tests on the network page that includes the test injector script. In some cases, the test injector script can serve as a bootstrap mechanism for initiating testing of a network page by loading one or more test resources in response to a captured error by the test injector script, the network page test system 114, or by the network application 112.

The computing device 122 can include any type of computing device that may be used to test a network page. In an illustrative embodiment, the computing device 122 can correspond to a wide variety of computing devices including personal computing devices, laptop computing devices, hand-held computing devices, terminal computing devices, mobile devices (e.g., mobile phones, smart phones, tablet computing devices, etc.), wireless devices, various electronic devices and appliances, video game systems, kiosks, and the like. In an illustrative embodiment, the computing device 122 may include hardware and/or software components for establishing communication over a communication network 104. For example, the computing device 122 may be equipped with networking equipment and browser software applications that facilitate communications via a network (e.g., the Internet) or an intranet. The computing devices 122 may have varied local computing resources such as central processing units and architectures, memory, mass storage, graphics processing units, communication network availability and bandwidth, etc.

The computing device 122 may include a network application 112 for accessing and/or executing one or more network pages. This network application 112 may include any type of application that can access the one or more network pages. For example, the network application 112 may include a browser or a mobile application (sometimes termed "app"). Further, in some cases, the computing device 122 may include a network page test system 114 for injecting a test injector script into a network page that has been accessed by the network application 112. As illustrated in FIG. 1, the network page test system 114 may be included as part of the network application 112. In other cases, the network page test system 114 may be a separate system from the network application 112. In some embodiments, the network page test system 114 may be a hardware device that is in communication with the computing device 122. In other cases, the network page test system 114 may be a separate software application, or a software module or plug-in for the network application 112.

The test repository 130 may include a number of data stores or data structures (e.g., tables, databases, etc.) for storing test information and test resources. For example, the test repository may include a test log data store 132 and a test resources data store 134. The test log data store 132 may include any type of data related to tests performed on a network page. For example, the test log data store 132 may include a record of the tests performed on a network page and the results of the performed tests. The test resources data store 134 may include any type of data or information for facilitating testing of a network page. For example, the test resources data store 134 may include data that may be added to elements (e.g., text fields, forms, list selections, etc.) of a network page under test. As a second example, the test resources data store 134 may include one or more test processes, test algorithms, or test macros for testing a network page under test. In some cases, the test resources data store 134 may also include the identity of tests to perform on a network page and/or metadata to add to the network page identifying the tests to perform to a test injector script.

Tests of a network page may be initiated by a developer user (or non end-user), such as a test engineer, a software developer, or an administrator, who is developing the network page or is assigned to test the network page. Such a user may use the computing device 122 to initiate testing of a network page hosted by the interactive computing system 110 and/or one of the network sites 106. In such cases, the user may manually initiate a test of the network page by, for example, accessing a button or other interface element included in the network page under test. In other cases, the user may access a developer console, script console, or other network application 112 interface for causing a test process to be initiated on a network page under test. Using such a console, the user or developer may execute a bootstrap script that initiates testing. For example, the user may type "object.test" to initiate a JavaScript bootstrap method that runs or initiates a test process. This test process may be performed or initiated by the test injector script included in the network page by the network page test system 114 or the network page test injector 140. In some cases, the test process may be performed by a processor or other hardware of the computing device 122.

Users, or end-users, may access a network page under test or otherwise using the user computing devices 102. The user computing devices 102 can include any type of computing device. Further, the user computing devices 102 can include some or all of the embodiments described with respect to the computing device 122. The users may access the network page at the interactive computing system 110 and/or at the network sites 106 over a network 104. The network 104 can include any type of network. For example, the network 104 may be a local area network (LAN), wide area network (WAN), Wi-Fi network, cellular network, satellite network, ad hoc network, or combinations of the same. In some cases, the network 104 may include the Internet.

As illustrated in FIG. 1, the user computing device 102, much like the computing device 122, may include a network application 112 for accessing a network page. Further, in some cases the user computing device 102 may include a network page test system 114 for injecting a test injector script into a network page. In some cases, the network page test system 114 may include the test injector script and/or may be the test injector script.

Although it is typically desirable that testing occur at the interactive computing system 110 (e.g., by the computing device 122), in some cases, it is advantageous for testing to be performed by the user computing device 102. For example, when an error accessing a network page occurs in response to an end-user's access of the network page, it is often desirable for at least some tests to be performed in the context of the user's system (e.g., the user computing device 102) because, for example, it may be difficult to replicate the error or the context in which the error occurred at a later time or on a different computing system.

Example Network Page Test Process

Figure 2:
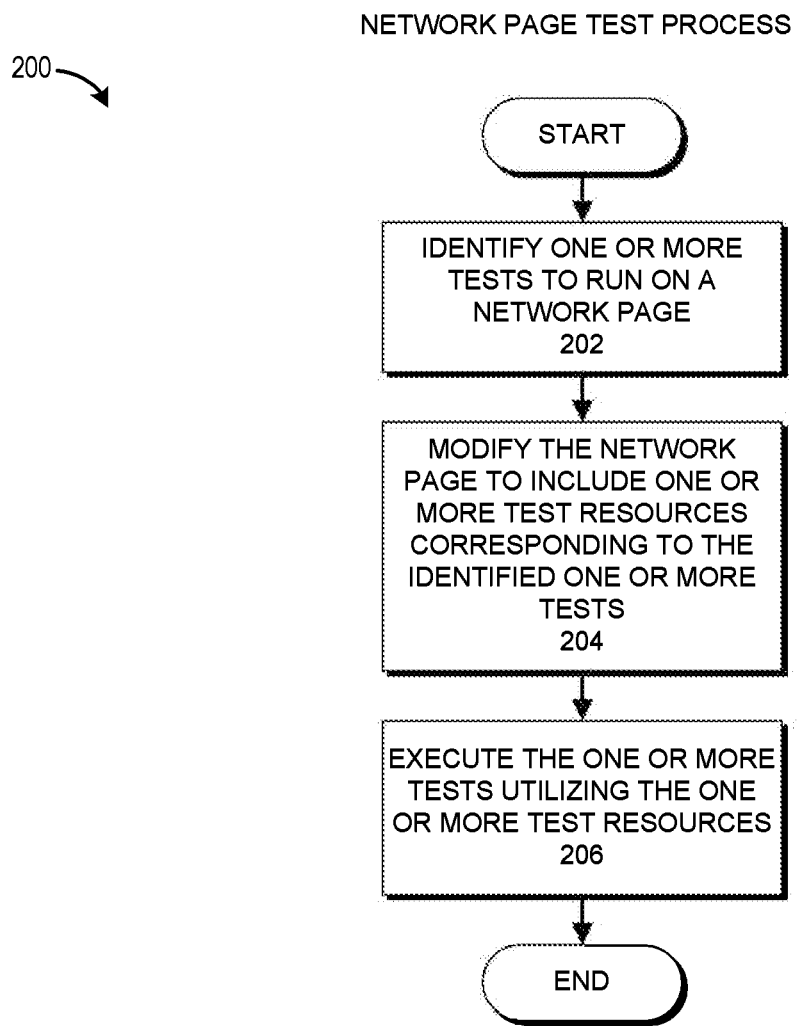
FIG. 2 presents a flowchart of an embodiment of a network page test process.

FIG. 2 presents a flowchart of an embodiment of a network page test process 200. The process 200 can be implemented by any system that can test a network page. For example, the process 200, in whole or in part, can be implemented by a server 120, a computing device 102, 122, a network page test injector 140, a test repository 130, or a network page test system 114, to name a few. Although any number of systems, in whole or in part, can implement the process 200, to simplify discussion, the process 200 will be described with respect to particular systems.

The process 200 begins at block 202 where, for example, a test injector script identifies one or more tests to run on a network page under test. As previously stated, the test injector script may be injected into the network page by a network page test system 114 or a network page test injector 140. Some example embodiments for identifying the one or more tests to run on the network page are described in more detail with reference to FIG. 3 below.

At block 204, the test injector script modifies the network page under test to include one or more test resources corresponding to the identified one or more tests. The one or more test resources can include test scripts (e.g., JavaScript, ActionScript, etc.), test data, or any other type of testing resource that may facilitate performing one or more tests of a network page. Some example embodiments for accessing the test resources are described in more detail with respect to FIG. 3 below. Modifying the network page may include modifying a document object model (DOM) of the page to include one or more of the test resources identified at the block 204. Further, in some cases, modifying the network page may include providing a location for test results to be provided. This location may include another application, another computing system, a repository, and/or to a display to present to a user. In some cases, the network page may be modified dynamically without a refresh of the network page or of the entire network page. This may be accomplished, e.g., using Asynchronous JavaScript and XML (Ajax) techniques.

Figure 4A:
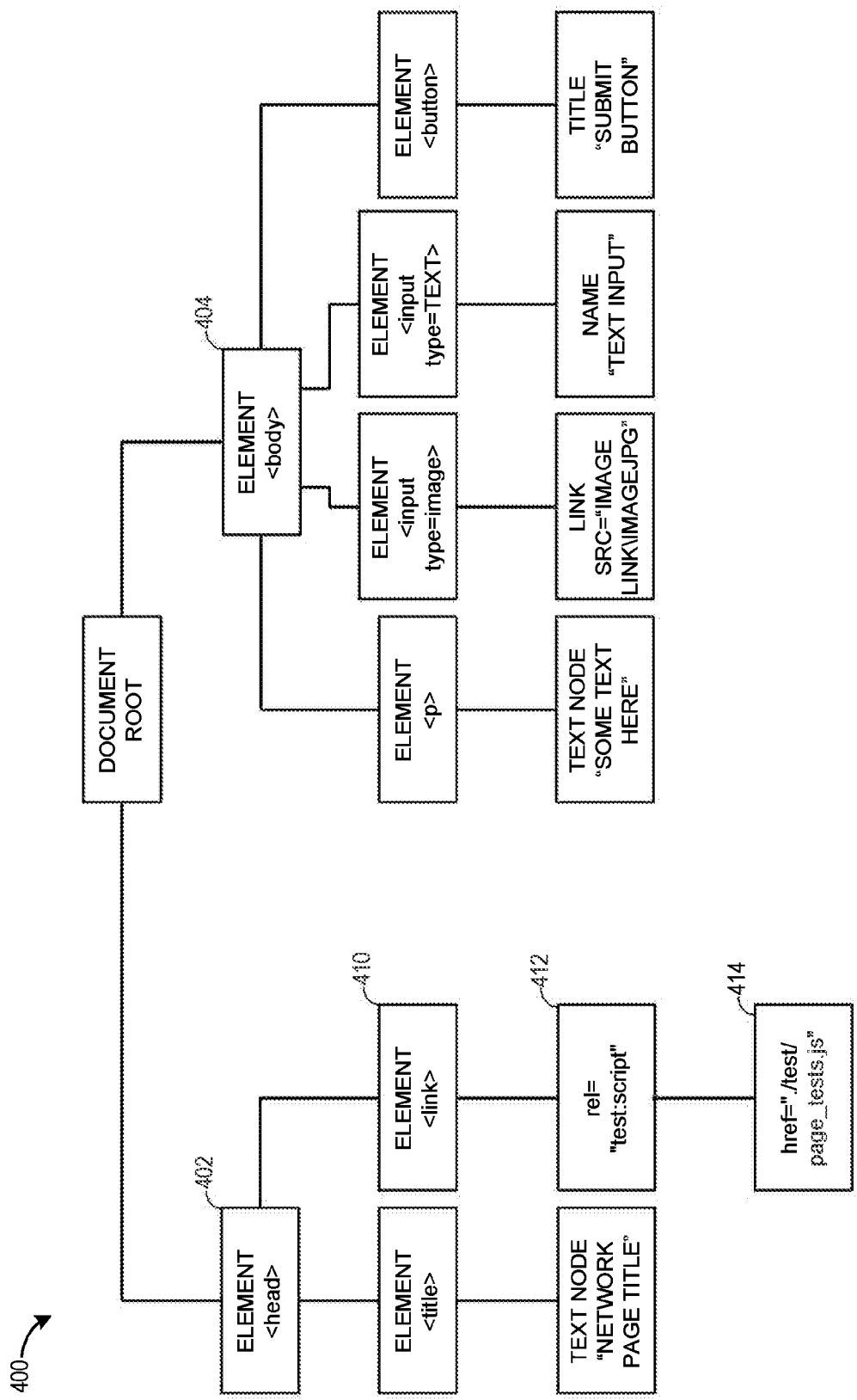
FIG. 4A illustrates an example document object model (DOM).
Figure 4B:
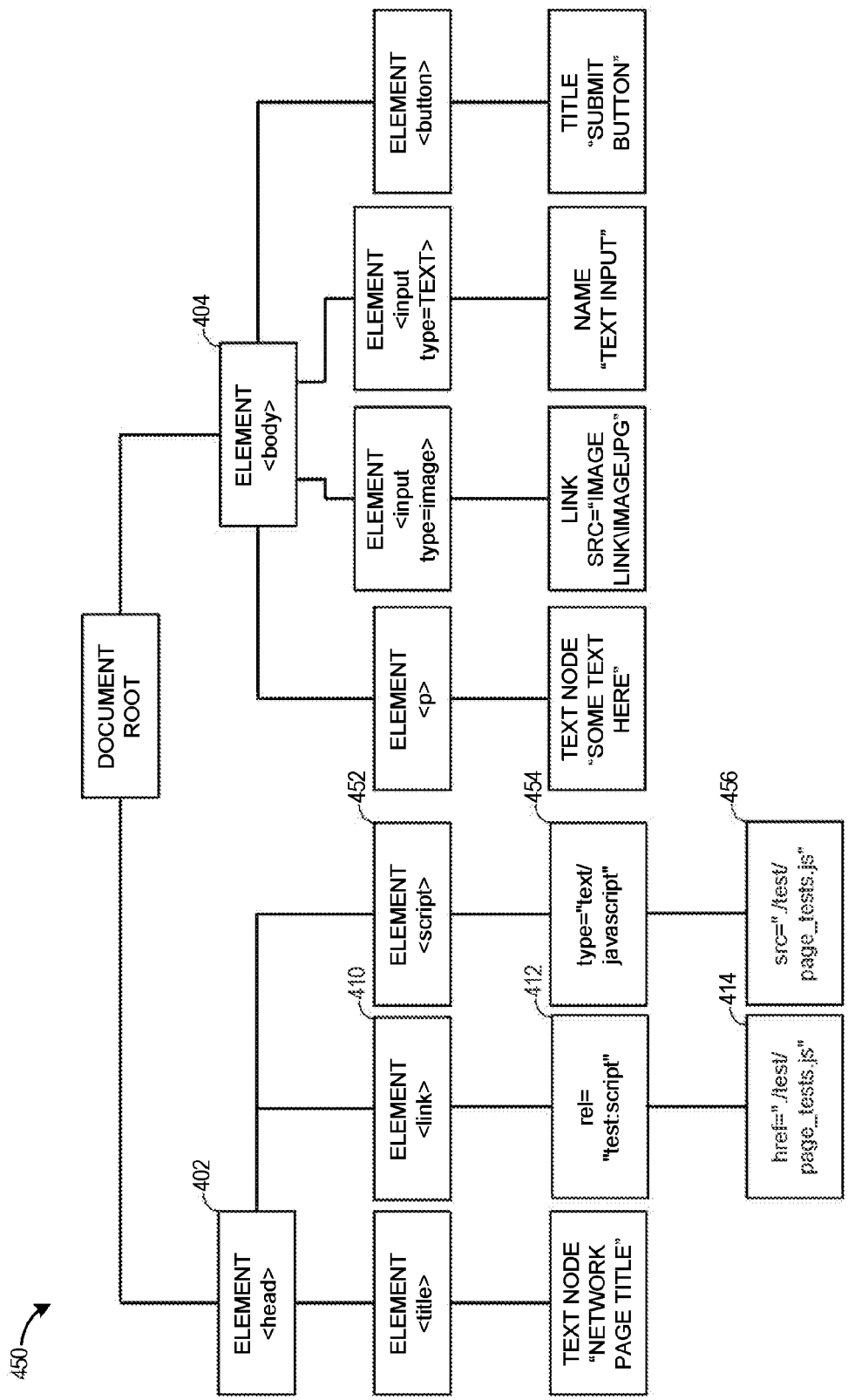
FIG. 4B illustrates an example document object model (DOM) with a loaded test resource.

Some example embodiments for modifying the network page are described in more detail with respect to FIGS. 4A and 4B.

The network application 112, at block 206, executes the one or more tests utilizing the one or more test resources of block 204. The one or more tests can include any type of test including tests that may be difficult if not infeasible to perform using existing test tools that rely on specialized test environments. For example, the types of tests may include tests that require a user to log in as an end user instead of as a special test user with user credentials stored in test code. As a second example, the types of tests may include tests that can check specific behavior in specific browsers by performing the tests within the browsers. These types of tests can be more accurate than tests performed by test tools that emulate a browser because, for example, the emulated browser may not be precise or may not include configuration modifications made by end-users. A third example of types of tests that may be performed include regression tests that may be specific to a user, browser, or other environmental factor associated with an execution environment. In some cases, the tests may be executed without generating a test container around the network page or without encapsulating the network page with a test environment. The network application 112 may execute the tests and/or initiate test processes by processing nodes of the DOM that include the test resources. In some cases, processing the nodes of the DOM that include the test resources may be similar to processing the DOM for a non-modified network page. In some embodiments, the block 206 may include recording and/or logging results of executed tests to a repository, such as the test repository 130. Further, in some embodiments, after the one or more tests have been executed; test resources, resource identifiers, and/or test code may be stripped out or removed from the network page. Removing the test code or resource identifiers may include removing corresponding nodes from the DOM for the network page under test. In some embodiments, at least some of the tests may be performed by an external system, such as the servers 120 or the interactive computing system 110.

After the tests are executed, a result of the test may be presented to a user (e.g., an administrator or test engineer). In some cases, the user can review the test results and decide whether modifications should be made to the network page or whether additional testing should be performed. Further, a history of the tests performed and the results of the tests may be stored at the test repository 130. In certain embodiments, one or more additional tests may be performed in response to a result of a test. These additional tests may be identified in a number of ways including by metadata in the network page, by the test code previously executed, by information stored at the test repository 130, and the like.

In some embodiments, the process 200 may be performed using a headless network application, such as a headless browser. Advantageously, in certain embodiments, using a headless network application enables testing to be performed in an automated manner. For example, in some cases, the results of an initial batch of tests may be provided to a network page test system 114, which may then initiate additional tests based on the result of the tests executed at the block 206. In other words, in some cases, the test injector script can load a master script that may perform an initial set of tests or actions, and based on the result of the tests, additional test scripts may be loaded and initiated by the test injector script. One potential benefit of loading tests selectively can be a reduction of the impact testing may have on the performance of the network page. While reducing the performance impact of testing on a network page may be desirable for some or all users, it can be particularly desirable when tests are performed on the computing systems of end-users, who may prevent tests from running to completion if they impact the end-users' quality of service.

Although the previous example involving a master script is described in the context of a headless browser, it is not limited as such. In other words, a similar process may be performed with respect to any type of network application 112. Further, using a headless browser or headless application can enable results of performing a test to be stored in a memory or memory buffer. Accordingly, the results can be inspected programmatically instead of, or in addition to, being presented on a display to a user to analyze.

In some cases, a computer processor or other hardware device may perform one or more of the blocks of the process 200 in response to a request by the test injector script. For example, a hardware processor of the user computing device 102 or of the server 120 may perform some or all of the process 200 in response to a request from the test injector script.

Example Test Identification Process

Figure 3:
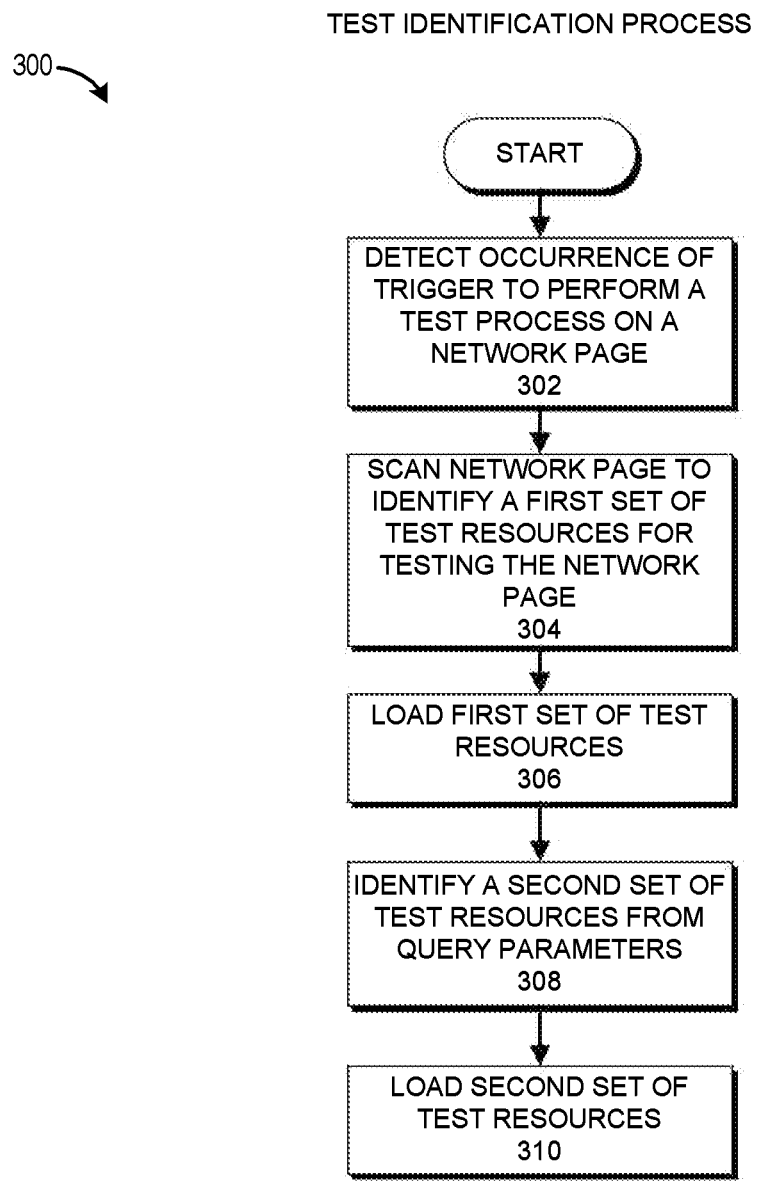
FIG. 3 presents a flowchart of an embodiment of a test identification process.

FIG. 3 presents a flowchart of an embodiment of a test identification process 300. The process 300 can be implemented by any system that can identify tests and/or load test resources for testing a network page. For example, the process 300, in whole or in part, can be implemented by a server 120, a computing device 102, 122, a network page test injector 140, a test repository 130, or a network page test system 114, to name a few. In some embodiments, at least parts of the process 300 may be performed as part of the block 202 and/or 204. Although any number of systems, in whole or in part, can implement the process 300, to simplify discussion, the process 300 will be described with respect to particular systems.

The process 300 begins at block 302 where, for example, the test injector script detects an occurrence of a trigger to perform a test process on a network page. The network page to be tested may include the test injector script performing the block 302. However the block 302 is not limited as such. For example, in some cases the block 302 may be performed by a network page test system 114 included in a network application 112. The trigger detected at the block 302 may include receiving a command from a user, such as an administrator, via a network application 112 interface, such as a console or command line interface. Alternatively, or in addition, the trigger may be the detection of an error. Another example of a test trigger may include a command provided as a query parameter. In some cases, this query parameter trigger may cause one or more tests to be run almost immediately, or when the network page is accessed. By using a query parameter to initiate testing of a network page, a number of network pages may be tested in an automated fashion. In some cases, a script or automated tool may be used to initiate testing of a set of network pages by accessing the set of network pages using a query parameter that triggers the testing of the set of network pages.

In some such cases, at least some of the process 200 and/or 300 may be performed or initiated by overriding or executing code that overrides an error detection method or function native to the network application 112.

At the block 304, the test injector script may scan the network page to identify a first set of test resources for testing the network page. These test resources may be identified based on metadata or resource declarations included in the network page code. This metadata may be added to the network page by a user, such as a developer or administrator of the network page. Further, the metadata may identify one or more test resources and/or provide a location where one or more test resources may be accessed. An example of test metadata that may be added to a network page is illustrated below in Code Fragment 1.

Code Fragment 1: Test Metadata
```
<head>
<link rel="test:stylesheet" href="./test/additional.css"/>
<link rel="test: script" href="./test/page_tests.js"/>
</head>
```

In some cases, the test metadata may include a link to a Cascading Style Sheet (CSS) file, as illustrated in Code Fragment 1. This CSS file may include any type of stylesheet for presenting test results to a user. For example, the CSS may cause elements of the network page to be highlighted or encircled by a box if a test related to the elements fails. In some cases, the CSS may be omitted from the test metadata. For example, test results may be determined based on the behavior of the network page. As a second example, a stylesheet included with the network page may present the test results as existing stylesheets may be used to highlight a test result without the inclusion of an additional stylesheet in the test metadata.

At the block 306, the test injector script may load a first set of test resources. As previously described with respect to the block 204, the test injector script may modify the network page under test to include the test resources. These test resources may be included as part of the DOM of the network page under test. Further, loading the first set of test resources may include accessing a test repository 130 that includes at least some of the identified test resources. Alternatively, or in addition, loading the first set of test resources may include accessing a local store or any other system that may be accessible by the user computing device 102 and/or computing device 122 for accessing code and/or data that may be used as test resources. In some cases, loading the first set of test resources may include accessing the servers 120 to load the test resources and/or to cause execution of one or more tests corresponding to the identified test resources. In some embodiments, the block 306 is omitted. For example, if no test resources are identified at the block 304 when scanning the network page, the block 306 may be skipped or omitted. As a second example, if the identity of test resources included in the network page is overridden or superseded by a user command or the identity of test resources via query parameters, the block 306 may be omitted. In cases where some test resources are identified by scanning the network page and some test resources are identified by query parameters, the block 306 may be performed for at least the test resources identified by scanning the network page at block 304.

At block 308, the test injector script may identify a second set of test resources from one or more query parameters. These query parameters may be included as part of a uniform resource locator (URL) string or uniform resource indicator (URI) string used to access the network page. In some cases, the query parameters may include metadata included as part of the URL or URI. Further, as with the metadata described above with respect to the block 304, the query parameters may identify one or more test resources and/or provide a location where one or more test resources may be accessed. An example of a URL with query parameters for a network page is illustrated below in Code Fragment 2.

Code Fragment 2: URL Test Metadata
http:// . . . /page.html?stylesheet=./test/additional.css&script=./test/page_tests.js At block 310, the test injector script loads the second set of test resources. The block 310 may include some or all of the embodiments previously described with respect to the block 306. Further, in some embodiments, the block 310 is omitted. For example, if no test resources are identified at the block 308 when accessing or processing the query parameters, or is no query parameters exist, the block 310 may be skipped or omitted. As a second example, if the identity of test resources included in the query parameters is overridden or superseded by a user command, the block 310 may be omitted. In cases where some test resources are identified by scanning the network page and some test resources are identified by query parameters, the block 310 may be performed for at least the test resources identified from the query parameters at block 308.

One example implementation of the process 300 includes adding identified test resources to a dictionary object having one or more key-value pairs where the keys represent resource types (e.g., stylesheet, script, etc.) and the values are lists of the specific resource URLs. An example of this implementation is illustrated below in Code Fragment 3.

Code Fragment 3: Test Identification
```
resources={ }
for link in head.getElementsByTagName ('link'):
    if link.rel in ['test:stylesheet', 'test:script']:
        add_from_link(link, resources)
query_params=parse_params(window.location)
for kind in query_params.keys( ):
    if kind in ['stylesheet', 'script']:
        for resource in query_params[kind]:
            add_from_param(resource, kind, resources)
```

As can be seen from the Code Fragment 3, the add_from_link method can add stylesheets and scripts to a dictionary object, "resources," that are identified from the network page metadata. In some cases, adding the stylesheets and scripts to the dictionary object may ensure that no two elements resolve to the same physical resource and can prevent a test resource from being added to more than once to the DOM. Similarly, the add_from_param method may add stylesheets and scripts identified from query parameters to the dictionary object.

In certain embodiments, one or more of the blocks of the process 300 may be performed in a different order and/or in parallel. For example, the blocks 308 and 310 may be performed before the blocks 304 and 306. As a second example, the blocks 304 and 308 may be performed in parallel. In other embodiments, the process 300 is performed specifically in the order illustrated in FIG. 3. Advantageously, in certain embodiments, by performing the process 300 in the order presented in FIG. 3, a user may override the identity of test resources included in the network page with alternative test resources identified via the query parameters. For example, in some cases a test resource may be identified by metadata included in the code of the network page. This test resource may be identified as part of the block 304. A user (e.g., a developer user) may override this test resource by including the identity of an alternative test resource with the same identifier but a different location as part of a query parameter accessed at the block 308. In some embodiments, the blocks 304 and 306 may be optional. In other embodiments the blocks 308 and 310 may be optional. In other words, in some cases, test resources may be identified based on metadata included in the network page or based on query parameters, but not both. However, in other cases, as previously described, test resources may be identified based on both metadata in the network page code and query parameters.

In some cases, a computer processor or other hardware device may perform one or more of the blocks of the process 300 in response to a request by the test injector script. For example, a processor of the user computing device 102 of a server 120 may perform some or all of the process 300 in response to the test injector script.

Example Document Object Model

FIG. 4A illustrates an example of a portion of a document object model 400 for a network page. Although not limited as such, a DOM is generally illustrated in a tree format as shown in FIG. 4A. The DOM 400 includes a head element 402 and a body element 404 corresponding to a head and a body of network page code. Each of these elements 402 and 404 may include a number of subelements. For example, the head element 402 may include a link element 410. Each element may in turn point to additional subelements until reaching a leaf node that includes data of a type corresponding to the parent element. For example, a text-based element, such as a title, may include text in the leaf node. Similarly, an image element may include a link to an image and a link element may include a reference to another test resource located at another network location. In some cases, some of the elements may include test metadata for identifying one or more test resources that may be loaded as part of a test process, such as the process 300. For example, in the DOM 400, the element 410 is a link element which includes a subelement 412 referencing a stylesheet for presenting test results. This subelement may in turn include another subelement 414 that points to a location of a test script.

FIG. 4B illustrates an example document object model 450 for the same network page represented by the DOM 400, but with a loaded test resource. As seen in the FIG. 4B, the DOM 450 includes much of the elements of the DOM 400 from FIG. 4A. For example, the DOM 450 includes the element 410 with subelement 412 including a link to a test resource. As previously described, a test injector script can identify a test resource to load based on metadata included in a network page. For example, the test injector script can determine from the element 410 to load a test resource identified in the subelement 412. The test injector script can modify the DOM to include the test resource. This is illustrated by the element 452 which includes a script type identified in subelement 454 and a link to the script in subelement 456. This element may, for example, be loaded from a test repository 130.

In some embodiments, test resources or test scripts may be appended to the bottom of a network page's code. In such cases, the test resources or test scripts do not block the rest of the network page from loading. If asynchronous code is used, the test resources or test scripts may be inserted throughout the network page code without preventing the network page from being loaded.

One example of a process for modifying a network page, such as part of the block 204 is illustrated below in Code Fragment 4. In some cases, the code for modifying a network page may be JavaScript that can load additional JavaScript for performing network page tests. As previously stated, modifying the network page may include modifying the DOM of the network page to include test resources identified by metadata included in the network page or query parameters included with the URL for accessing the network page. It is notable that in the example of Code Fragment 4, the process of modifying the page occurs if metadata is identified during execution of Code Fragment 3. Thus, in some cases, the test injector script may be retained in a production network page while removing test metadata without adverse effects. In some such cases, future testing may be performed on the production network page by including appropriate query parameters in a URI string for accessing the network page that references test resources stored, for example, at the test repository 130.

Code Fragment 4: Page Modification
if len(resources)>0:
add_to_page('css', test_dir('mocha.css'))
add_to_page('script', test_dir('mocha.js'))
add_to_page('script', test_dir('chai.js'))
add_results_div( )
for kind in ['stylesheet', 'script']:
for resource in resources[kind]:
add_to_page(kind, resource)

One example of a resulting network page after the modification of the network page to include one or more test resources identified in the metadata of the network page is illustrated in Code Fragment 5.

Code Fragment 5: Network Page Test Metadata
<head>
<script type="text/javascript" src="./test/injector.js"></script>
<link rel="stylesheet" href="./test/node_modules/mocha/mocha.css"/>
<script type="text/javascript" src="./test/node_modules/mocha/mocha.js"></script>
<script type="text/javascript" src="./test/node_modules/chai/chai.js"></script>
<link rel="stylesheet" href="./test/additional.css"/>
<script type="text/javascript" src="./test/page_tests.js"></script>
</head>

As can be seen from the Code Fragment 5, in some cases, one or more test frameworks may be utilized to facilitate performing tests associated with the test resources and presenting the results of tests to a user. For example, open-source JavaScript testing frameworks, such as Mocha, and libraries, such as Chai, may be used to facilitate executing the tests. These test frameworks may be added to the network page under test as well as the test resources loaded from the "resources" dictionary object described with respect to Code Fragment 3.

Further, as can be seen in Code Fragment 5, to generate the modified network page, which may be obtained by modifying the DOM, the CSS links identified in the test metadata of Code Fragment 1 can be transformed by replacing the "rel" attribute from "test:stylesheet" to "stylesheet." Moreover, the scripts may be transformed by changing the "link" element type to a "script" element type, removing the "rel" attribute, adding the "type" attribute with the value "test/javascript" and changing the attribute name from "href" to "src" for the destination link.

Terminology

A number of computing systems have been described throughout this disclosure. The descriptions of these systems are not intended to limit the teachings or applicability of this disclosure. For example, the computing device 122 described herein can generally include any computing device(s), such as desktops, laptops, servers, and distributed computing systems, to name a few. As a second example, the user computing device 102 can generally include any computing device(s), such as desktops, laptops, servers, video game platforms, television set-top boxes, televisions (e.g., internet TVs), computerized appliances, and wireless mobile devices (e.g. smart phones, PDAs, tablets, electronic book readers, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the interactive computing system 110 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A computer-implemented method for testing a network page, the computer-implemented method comprising:
   as implemented by a computing system including one or more hardware processors,
   in response to a test trigger:
   identifying, using a test injector script, one or more tests to run on a network page from test identification metadata associated with the network page, wherein code for the test injector script is included with code for the network page, wherein the one or more tests are identified based at least in part on the detection of an anomaly in a particular execution environment, the particular execution environment comprising a production environment separate from a test environment, wherein at least one test corresponds to testing for a specific operational behavior within a specific host application capable of executing the network page;
   scanning network page code of the network page to identify a first set of test resources corresponding to the identified one or more tests;
   modifying, using the test injector script, the network page to inject the first set of test resources into the network page, wherein modifying the network page comprises modifying a document object model (DOM) of the network page to include at least the first set of test resources, wherein at least one of the first set of test resources comprises executable code, and wherein at least one test corresponds to testing for a specific operational behavior within a specific host application of the particular execution environment capable of executing the network page;

identifying an alternative test resource from a query parameter included with a network page identifier string of the network page;

overriding a test resource from the first set of test resources with the alternative test resource to obtain a second set of test resources, wherein a first identifier of the test resource and a second identifier of the alternative test resource are the same, and wherein a first storage location of the test resource and a second storage location of the alternative test resource are different;

modifying the network page to inject the second set of test resources into the network page;

executing the one or more tests utilizing the second set of test resources without generating a test container around the network page, wherein at least one of the second set of test resources comprises executable code, wherein executing the one or more tests includes performing regression testing corresponding to the particular execution environment;

identifying a linked network page that is linked to the first network page;

executing a test on the linked network page using the test injector script included with the network page; and removing test metadata corresponding to the second set of test resources after execution of the one or more tests is completed.

2. The computer-implemented method of claim 1, wherein identifying, using a test injector script, the one or more tests comprises:

scanning network page code of the network page to identify the test identification metadata corresponding to the first set of test resources; and for each of the first set of test resources, determining a location for the test resource based at least partially on the test identification metadata and accessing the test resource.

3. The computer-implemented method of claim 1, wherein identifying, using a test injector script, the one or more tests comprises:

identifying the test identification metadata from a set of query parameters, the test identification metadata corresponding to a first set of test resources; and for each test resource of the first set of test resources, determining a location for the test resource and accessing the test resource.

4. The computer-implemented method of claim 1, further comprising removing the first set of test resources from the network page by modifying the DOM of the network page upon completion of the one or more tests.

5. The computer-implemented method of claim 1, wherein the test trigger comprises at least one of receiving a user command configured to trigger a test, detecting an error with respect to the network page, or receiving a query parameter for triggering a test.

6. A system for testing a network page, the system comprising:

a memory configured to store a test injector script; and one or more hardware processors in communication with the memory, the one or more hardware processors configured to at least inject the test injector script into a network page, such that the test injector script at least:

identifies one or more tests to run on the network page from test identification metadata associated with the network page, wherein code for the test injector script is included with code for the network page, wherein the one or more tests are identified based at least in part on the detection of an anomaly in a particular execution environment, the particular execution environment comprising a production environment separate from a test environment, wherein at least one test corresponds to testing for a specific operational behavior within a specific host application capable of executing the network page;

scans network page code of the network page to identify a first set of test resources corresponding to the identified one or more tests;

modifies the network page to inject the first set of test resources into the network page, wherein modifying the network page comprises modifying a document object model (DOM) of the network page to include at least the first set of test resources, wherein at least one of the first set of test resources comprises executable code, and wherein at least one test corresponds to testing for a specific operational behavior within the specific host application of the particular execution environment capable of executing the network page;

identifies an alternative test resource from a query parameter included with a network page identifier string of the network page;

overrides a test resource from the first set of test resources with the alternative test resource to obtain a second set of test resources, wherein a first identifier of the test resource and a second identifier of the alternative test resource are the same, and wherein a first storage location of the test resource and a second storage location of the alternative test resource are different;

modifies the network page to inject the second set of test resources into the network page;

executes the one or more tests utilizing the second set of test resources without generating a test container around the network page, wherein at least one of the second set of test resources comprises executable code, wherein executing the one or more tests includes performing regression testing corresponding to the particular execution environment;

identifies a linked network page that is linked to the network page;

executes a test on the linked network page using the test injector script injected into the network page; and removes test metadata corresponding to the second set of test resources after execution of the one or more tests is completed.

7. The system of claim 6, wherein the one or more hardware processors are configured to inject the test injector script into the network page by adding code corresponding to at least a portion of the test injector script to network page code corresponding to the network page.

8. The system of claim 6, wherein the one or more hardware processors are configured to at least inject the test injector script into a network page, such that the test injector script identifies the one or more tests by at least:

scanning network page code of the network page to identify test metadata corresponding to the first set of test resources; and for each of the first set of test resources, determining a location for the test resource based at least partially on the test metadata and accessing the test resource.

9. The system of claim 6, wherein the one or more hardware processors are configured to at least inject the test injector script into a network page, such that the test injector script further at least modifies the network page by modifying the DOM of the network page to include at least some of the second set of test resources.

10. The system of claim 9, wherein the one or more hardware processors are configured to at least inject the test injector script into a network page, such that the test injector script further at least removes the second set of test resources from the network page by modifying the DOM of the network page upon completion of the one or more tests.

11. The system of claim 6, wherein the one or more hardware processors are located at a user computing device.

12. The system of claim 6, wherein the one or more hardware processors are located at an interactive computing system configured to provide access to the network page.

13. The system of claim 12, wherein the one or more hardware processors are further configured to remove the test injector script in response to an external request to access the network page, the external request received from a computing system not included in the interactive computing system.

14. The system of claim 13, wherein the one or more hardware processors are further configured to remove test metadata corresponding to the second set of test resources in response to the external request to access the network page.

15. Non-transitory physical computer storage comprising test injector instructions stored thereon that, when executed by one or more processors upon injection into a network page, are configured to at least:
    identify one or more tests to run on the network page from test identification metadata associated with the network page, wherein code for the test injector script is included with code for the network page, wherein the one or more tests are identified based at least in part on the detection of an anomaly in a particular execution environment, the particular execution environment comprising a production environment separate from a test environment, wherein at least one test corresponds to testing for a specific operational behavior within a specific host application capable of executing the network page;
    scan network page code of the network page to identify a first set of test resources corresponding to the identified one or more tests;
    modify the network page to inject the first set of test resources into the network page, wherein modifying comprises modifying a document object model (DOM) of the network page to include at least the first set of test resources, wherein at least one of the first set of test resources comprises executable code, and wherein at least one test corresponds to testing for a specific operational behavior within a specific host application of the particular execution environment capable of executing the network page;
    identify an alternative test resource from a query parameter included with a network page identifier string of the network page;
    override a test resource from the first set of test resources with the alternative test resource to obtain a second set of test resources, wherein a first identifier of the test resource and a second identifier of the alternative test resource are the same, and wherein a first storage location of the test resource and a second storage location of the alternative test resource are different;
    modify the network page to inject the second set of test resources into the network page;
    execute the one or more tests utilizing the second test resources without generating a test container around the network page, wherein at least one of the second test resources comprises executable code, and wherein executing the one or more tests includes performing regression testing corresponding to the particular execution environment;
    identify a second network page that is linked to the network page;
    execute a test on the second network page using the test injector instructions of the network page; and
    remove test metadata corresponding to the second set of test resources after execution of the one or more tests is completed.

16. The non-transitory physical computer storage of claim 15,
    wherein the test injector instructions are injected into the network page by adding code corresponding to at least a portion of the test injector instructions to network page code corresponding to the network page.

17. The non-transitory physical computer storage of claim 15, wherein the test injector instructions, when executed by one or more processors, are further configured to at least identify the one or more tests by:
    scanning network page code of the network page to identify test metadata corresponding to the first set of test resources; and
    for each of the first set of test resources, determining a location for the test resource based at least partially on the test metadata and accessing the test resource.

18. The non-transitory physical computer storage of claim 17, wherein the test injector instructions, when executed by one or more processors, are further configured to at least remove the test metadata from the network page code.

19. The non-transitory physical computer storage of claim 15, wherein the test injector instructions, when executed by one or more processors, are further configured to at least modify the network page by modifying a document object model (DOM) of the network page to include at least some of the one or more of the second test resources.

20. The non-transitory physical computer storage of claim 15, wherein the test injector instructions, when executed by one or more processors, are further configured to at least:
    capture one or more test results from executing the one or more tests; and
    provide the one or more test results to a test repository.

21. The computer-implemented method of claim 1, wherein the network page identifier string comprises one of a Uniform Resource Indicator (URI) or a Uniform Resource Locator (URL).

* * * * *